United States Patent
Cato et al.

(10) Patent No.: US 6,754,811 B1
(45) Date of Patent: Jun. 22, 2004

(54) OPERATING SYSTEM DEVICE CENTRIC AGENT

(75) Inventors: Robert Thomas Cato, Raleigh, NC (US); Phuc Ky Do, Cary, NC (US); Eugene Michael Maximilien, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 562 days.

(21) Appl. No.: 09/595,974

(22) Filed: Jun. 16, 2000

(51) Int. Cl.[7] .............................. G06F 9/40; G06F 9/54; G06F 13/14; G06F 13/42; G06F 15/16
(52) U.S. Cl. .................. 712/227; 712/31; 712/225; 710/311; 710/313; 710/316; 710/61; 710/63; 710/71; 709/202; 709/203; 709/209; 709/230; 709/317
(58) Field of Search .................. 712/227, 31, 33, 712/225; 710/63, 316, 42, 313, 311, 61, 71; 370/402; 709/202, 203, 209, 230, 317; 703/23, 24; 717/118

(56) References Cited

U.S. PATENT DOCUMENTS

| | | | |
|---|---|---|---|
| 5,367,635 A | 11/1994 | Bauer et al. | 395/200 |
| 5,655,081 A | 8/1997 | Bonnell et al. | 395/200.32 |
| 5,675,794 A | 10/1997 | Meredith | 395/651 |
| 5,790,789 A | 8/1998 | Suarez | 395/200.32 |
| 5,872,931 A | 2/1999 | Chivaluri | 395/200.53 |
| 6,389,029 B1 * | 5/2002 | McAlear | 370/402 |
| 6,484,219 B1 * | 11/2002 | Dunn et al. | 710/42 |
| 6,546,450 B1 * | 4/2003 | Liu | 710/316 |

* cited by examiner

Primary Examiner—Daniel H. Pan
(74) Attorney, Agent, or Firm—J. Bruce Schelkopf; Winstead Sechrist & Minick

(57) ABSTRACT

A USB device centric agent is associated with an operating system. The agent software is only required to be loaded once and then it will function with multiple compatible USB devices. A standard interface is established between the device agent and any compatible USB device. This enables any compatible USB device to control the agent which in turn controls the host computer. This is opposite the standard practice where the host controls the USB device.

17 Claims, 7 Drawing Sheets

The USB device supports a small embedded Java Virtual Machine (JVM).

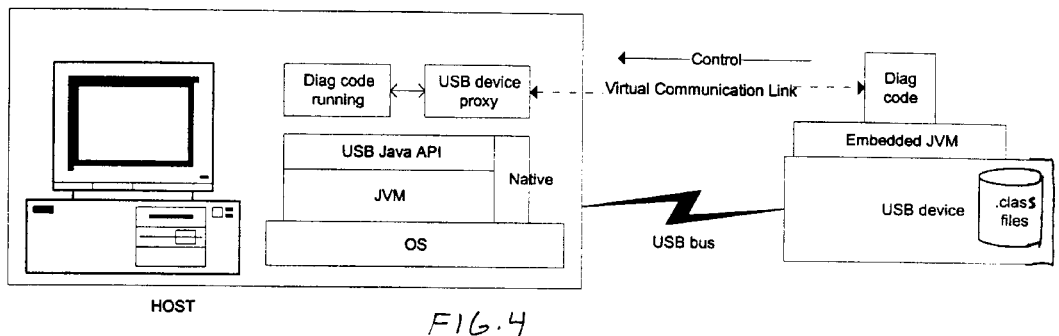

FIG. 4

NOTE: Once the USB API is ported over the different Java supported platforms, then this scheme works independently of the underlying OS. The USB API can be considered as a standard extension to the Java API.

Device does not support a small embedded JVM.

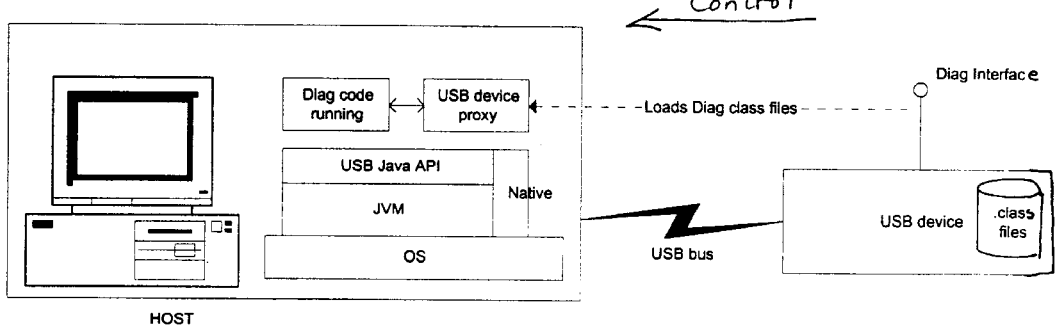

FIG. 5A

NOTE: Once the device enumerates it exposes an interface which allows the host to load the Java class files (executable Java byte code). The host then sets up a device proxy which it uses to perform the functions described above, including diagnosing the USB device.

OPERATING SYSTEM DEVICE CENTRIC AGENT

CROSS-REFERENCE TO RELATED APPLICATIONS

The present Application is related to U.S. patent application Ser. No. 09/426,855, filed Oct. 26, 1999, entitled "MULTIMODE NON-STANDARD UNIVERSAL SERIAL BUS COMPUTER INPUT DEVICE," and U.S. patent application Ser. No. 09/512,200, filed Feb. 24, 2000, entitled "AGENT PROVIDED BY USB DEVICE FOR EXECUTING USB DEVICE DEPENDENT PROGRAM IN USB HOST," which are hereby incorporated by reference herein.

TECHNICAL FIELD

The present invention relates in general to data processing systems, and in particular, to data processing systems adaptable for coupling to USB devices.

BACKGROUND INFORMATION

Within the past few years, an association of private manufacturers has created a universal standard and method for linking many peripherals to a personal computer simultaneously. This standard is referred to as the Universal Serial Bus (USB). The USB is a communications architecture or "bus" that provides a personal computer with the ability to interconnect to a wide variety of devices or peripherals via a relatively simple cable. The cabled peripherals share USB bandwidth through a host-scheduled, boolean based protocol. The bus allows peripherals to be attached, configured, used, and detached while the host and other peripherals are in operation. The USB allows for the replacement of peripherals that have previously been attached to special-purpose interfaces and accessed by direct hardware methods.

Input/output (I/O) devices frequently are shipped with diskettes and/or documentation that contain installation or setup data, diagnostic programs, drivers, a tutorial, a "readme" file, advertisements, and other information. Such diskettes and/or documentation are often misplaced or unavailable when needed.

Additionally, whenever an update is created by the manufacturer for such a device, an e-mail or traditional paper mail notice needs to be sent to each of the users, and then such users will be required to manually access a website in order to obtain such updates.

What is needed in the art is a system and method for eliminating such diskettes, documentation, and update messages, but yet still provide the user with all of the advantages thereof. Moreover, what is needed is a presentation of this information to the user that is controlled by the I/O device that is the subject of the information.

SUMMARY OF THE INVENTION

The present invention addresses the foregoing need. An agent is created that runs in the host machine that enables any compatible I/O device to control the host machine, the host machine's other I/O devices, and the host machine's communication capabilities. This enables the compatible device to interact with the user in ways that are device specific. The agent presents a common interface to the I/O devices so that host-to-host and operating system-to-operating system variations do not affect the interface. The common agent/device interface enables any compatible device to interact with the user in conjunction with information on the Internet. Once the agent is loaded in the host, any compatible device that is subsequently attached to the host can utilize the agent. Thus the agent need only be loaded once in any host.

Moreover the agent can be loaded into the host from an I/O device.

Alternatively, the agent software could have been packaged with the operating system, or could be downloaded from an Internet website. Further, an encrypted key could be used for security when downloading the agent over the Internet.

The device agent would detect when a compatible USB device is enumerated and would then query the device for device dependent information. This information would include what kind of information and software is available to support the device, where the information can be obtained, and/or software.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIGS. 4, 5A and 5B illustrate alternative embodiments for implementing the present invention;

DETAILED DESCRIPTION

Figure 1:
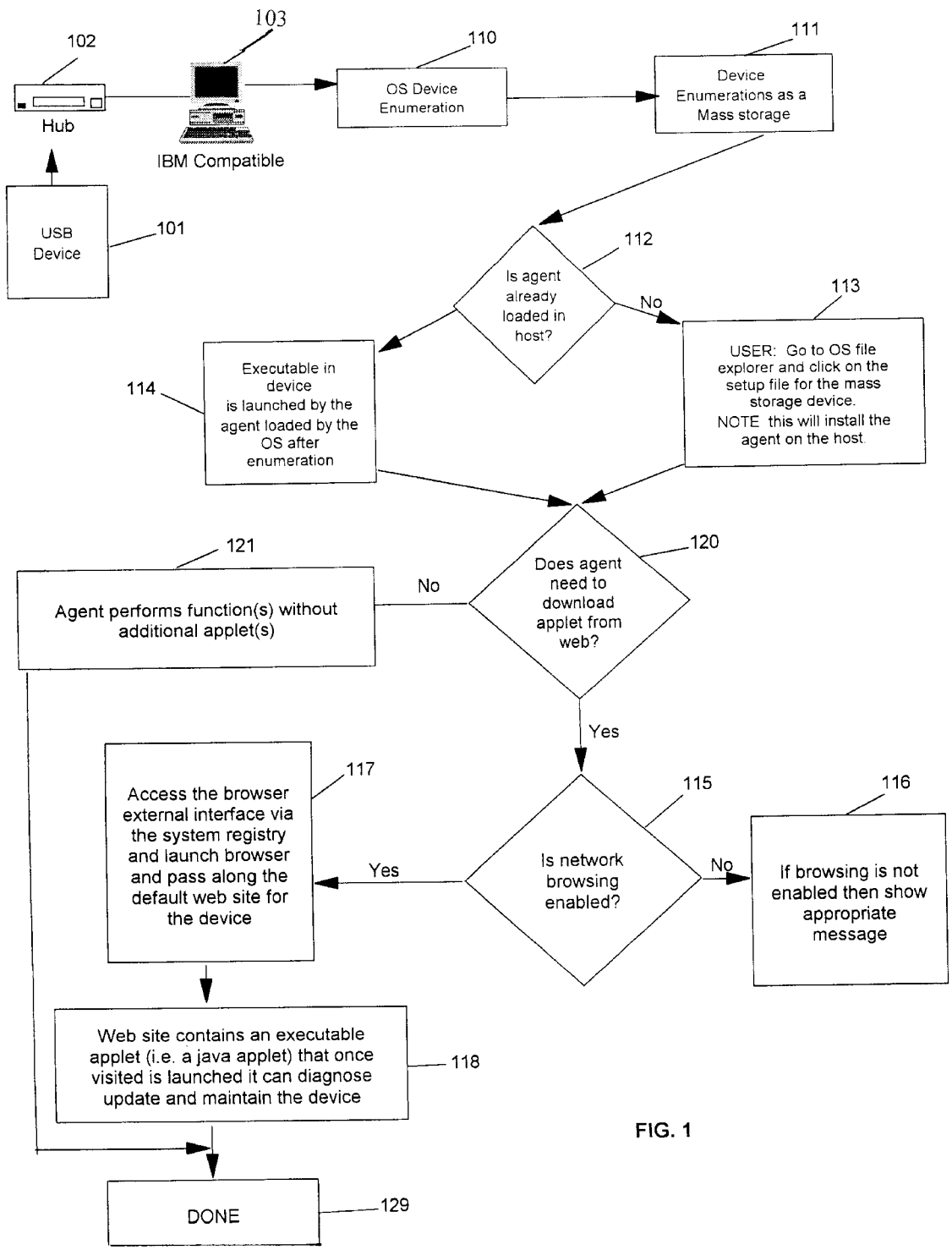
FIG. 1 illustrates a flow diagram in accordance with the present invention.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

The present invention implements a USB "device centric" agent that would be associated with the Operating System ("OS"), either by the OS manufacturer or by the user. The agent software would only need to be loaded once and then it could function with multiple compatible USB devices.

Figure 2:
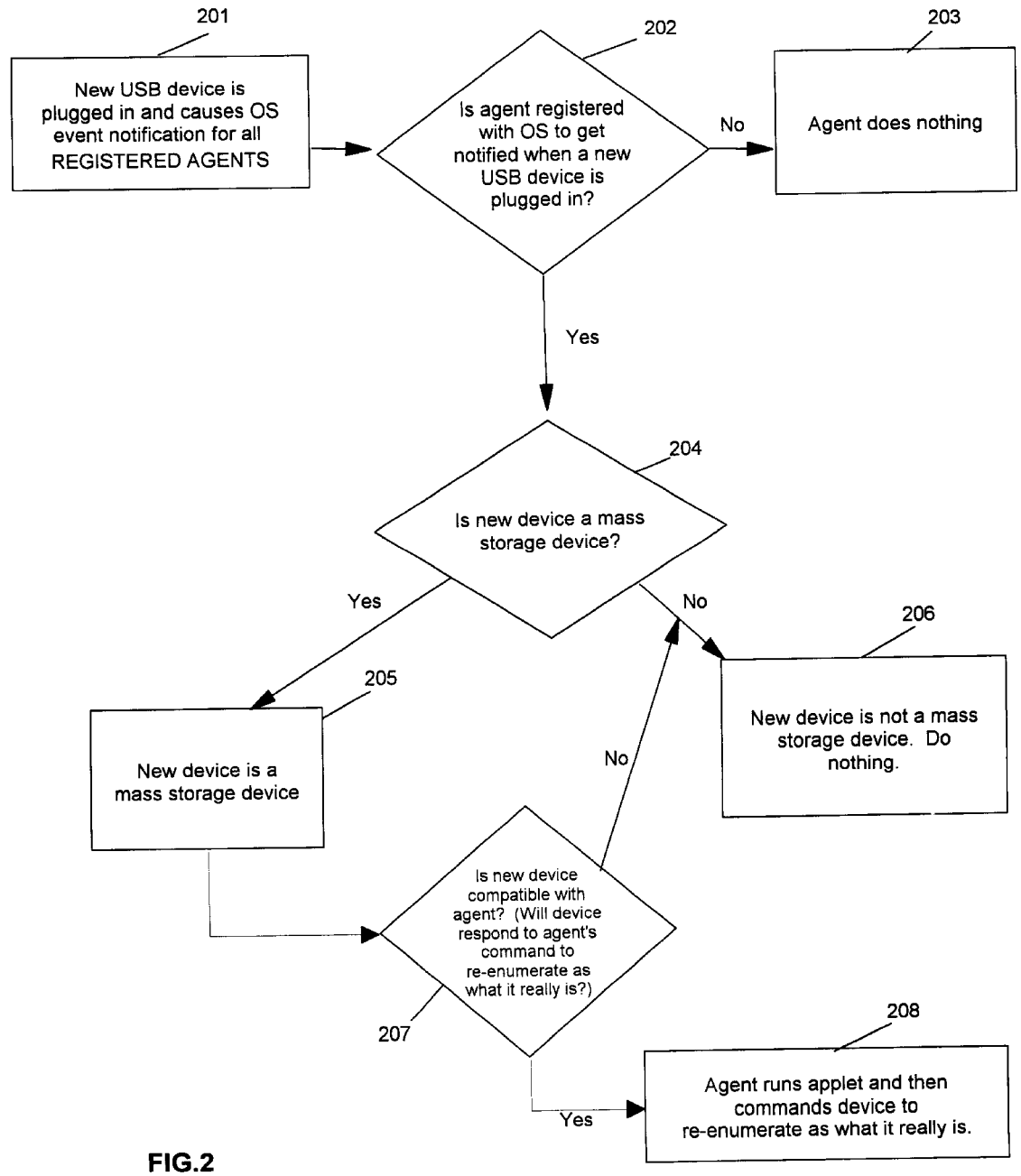
FIG. 2 illustrates a flow diagram of an agent sensing when other compatible USB devices enumerate as mass storage devices.

FIGS. 1 and 2, described in more detail below, illustrate one method for loading such an agent from a USB device coupled to the data processing system. This process is also described within cross-referenced U.S. patent application Ser. No. 09/512,200, which is hereby incorporated by reference herein.

Referring to FIG. 1, USB devices 101 typically have some type of storage device such as a read only memory (ROM) or a flash EPROM (electronically programmable read only memory). In one embodiment of the present invention, such a memory device will have sufficient memory capacity to store a Java based software program, which program could then take advantage of the Java Virtual Machine (JVM) that is included with Windows and most other operating systems, and Netscape Navigator. Unused EPROM space could be used to store one or more programs that could be used by the customer in association with the particular I/O device. An "agent" is uploaded from the USB device 101 into the host 103. The agent would then work with the host 103, which would provide the display, keyboard, mouse, etc., necessary for human interaction with other USB device specific programs. The device agent could store USB device specific information and/or software on the host's hard file and also (optionally) create an icon on the host's display desktop. The user could reuse the enhanced functions at a later time.

The basic idea would be that once the OS independent Java agent is loaded into the host 103, it would use a customized class loader that would load the interaction (diagnostics, etc.) classes from the device 101 (which appears as a USB storage device). These class files (Java executable byte codes) would describe to the agent how to interact with the USB device 101. After interacting with the USB device 101, the agent would then command the device to re-enumerate for normal use. The agent would subsequently detect when compatible USB devices enumerated as mass storage devices and then (as appropriate) command them to re-enumerate as what they truly are. Such an agent would use the USB Java API (application programming interface) plus some native code that gives Java access to the USB device 101.

As disclosed in the cross-referenced U.S. patent application Ser. No. 09/426,855, a USB device when connected to a host informs the host what it is. The USB device can pretend it is something else, i.e., it can enumerate as a device other than what it is, as long as the device knows how it is supposed to behave.

Referring again to FIG. 1, a USB device 101 is connected to a HUB 102 coupled to a host computer 103. The USB device 101 enumerates as a mass storage device in step 111. Note, device 101 could enumerate as any device capable of inputting data and recognizable by an operating system without the need for an additional driver. Hereinafter, such a device may also be referred to as an "enumerated input device."

In step 112, a determination is made whether there is an agent program already loaded in the host computer 103. If yes, then in step 114, an executable program in the device 101 is launched by the agent loaded by the operating system after enumeration. However, if an agent is not already loaded in the host 103, then the user will be required in step 113 to proceed to the operating system file explorer and click on the setup file for the mass storage device created by the enumeration (DOS commands could also be used), or will be required to download an agent from the Internet for storage in the host computer 103. Step 120 determines if the agent needs to download an applet from the Internet in order to provide a desired function. If it does, step 115 is executed. If not, then in step 121, the process performs whatever functions it can without additional applets. Afterwards, the agent is Done in step 129.

In step 115, a determination is made whether network browsing has been enabled. There are two possible ways of determining whether network browsing has been enabled. One way is for the system to walk the system registry to see if there exists an entry for the browser (i.e., Microsoft Internet Explorer (IE) or Netscape Navigator), and then attempt to launch the browser. If it fails or an entry in the registry cannot be found, then network browsing must be disabled. Note, since Microsoft bundles IE with their operating system, the browser is always present. The second way is that in most operating systems and system middleware (i.e, Java), there is the notion that components which can expose interfaces for "outsiders" to programably and dynamically query or communicate. For instance, Microsoft Internet Explorer exposes COM and COM+ interfaces that allow programmers to embed Internet Explorer's functionality into their programs and/or launch Internet Explorer directly (via the Microsoft Win32/COM API). This interface also exposes properties that allow a program to find out if network browsing is enabled. Note, Lotus Notes, Microsoft Money 99 and 2000 all are examples of applications using the IE COM interfaces. Other operating systems have similar approaches though they use other object communication middleware such as CORBA, JavaBeans (HotJava Network Browser).

If browsing has not been enabled, then in step 116, an appropriate message will be shown to the user that such browsing is not enabled. However, if network browsing is enabled, then in step 117 the process will access the browser external interface via the system registry and launch the browser and pass along the default website for the device. This can be accomplished in a manner similarly as described above in the second option for determining if network browsing is enabled. Part of the exposed functionality is interfaces for dynamically commanding the browser to go to a particular site. The website will contain an executable applet that once visited is launched, and it can then diagnose, update, maintain, or enhance the functionality of the device 101.

Figure 7:
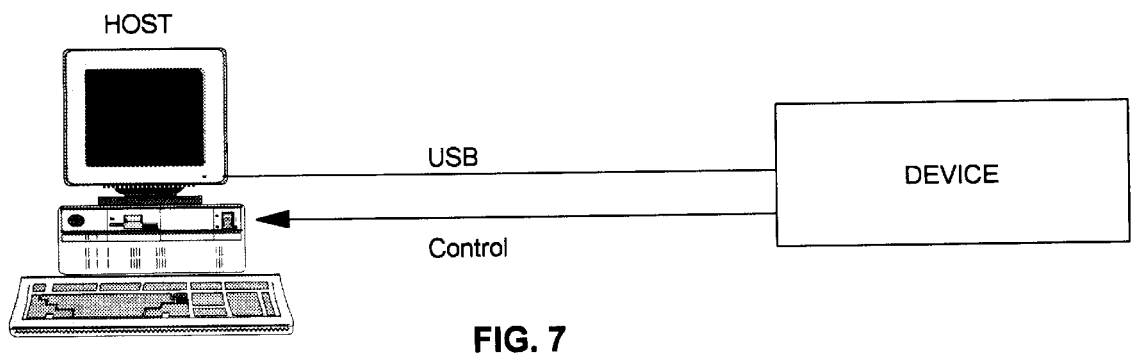
FIG. 7 illustrates control of the host by the USB device.
Figure 8:
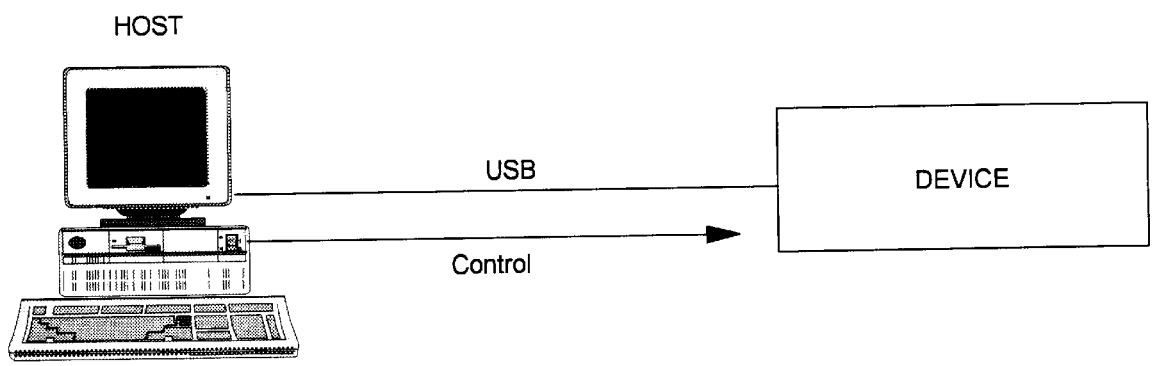
FIG. 8 illustrates control of the USB device by the host.

A standard interface is established between a device agent and any compatible USB device. This enables any compatible USB device (even devices from different manufactures) to "control" the agent, which in turn controls the host computer's, and its I/O devices such as its display, keyboard, mouse, etc. The important concept here is that the USB device will control what the agent does, and then the agent controls the host. (See FIG. 7) This is opposite of the standard practice in the industry of the host controlling the USB device. (See FIG. 8)

In addition to providing the functions described below, the agent program would sense when compatible USB devices enumerate as mass storage devices in order to facilitate loading the agent into the host. The agent would then send a command to the recently enumerated compatible "mass storage device." The agent's command would cause the USB device to disconnect from the USB and re-enumerate as what it really is. This is illustrated in FIG. 2 where in step 201 a new USB device is plugged in and causes an operating system event notification for all registered agents. The process of a USB device disconnecting, reconnecting and re-enumerating in a different mode is described in the cross-referenced U.S. patent application Ser. No. 09/426, 855. Thereafter, in step 202, a determination is made whether the agent is registered with the operating system to get notified when a new USB device is plugged in. If not, then in step 203, the agent does nothing. However, if the answer is affirmative in step 202, the process proceeds to step 204. In step 204, a determination is made whether the new device is a "mass storage device." Again, alternatively, any device capable of input could suffice. The host or an agent in the host can determine the characteristics of a newly enumerated device by looking at the descriptors that the device provides the host during enumeration. The standard process of a USB device enumerating with a USB is common knowledge among programmers familiar with standard USB host systems. If the new device enumerates as a "mass storage device," then a determination is made in step 207 if the new device is compatible with the agent. In other words, whether the new device will respond to the agent's command to re-enumerate as what it really is. If not, the process proceeds to step 206 where the new device is designated as not a mass storage device, and then nothing is performed in the process. If in step 207 the new device is compatible with the agent, then the process proceeds to step 208 where the agent runs an applet (if any) and then commands the device to re-enumerate as what it really is.

To restate part of the above, the device agent would detect when a compatible USB device is enumerated and would then query the device for device dependent information. This information would include what kind of information and software is available to support the device and where the information can be obtained. In addition to providing the information itself, the device could provide a web URL that would provide more information.

The agent can then gather the information and software and utilize the host's resources such as its display, keyboard, mouse, other I/O or Internet connection to enable the user to interact with the software in a useful way. The information and software could include the following: installation or setup software and data including how the user interface appears and operates, diagnostic programs, drivers, tutorial, "readme" file, advertisements, URL for more information, USB topology analysis software for I/O maintenance and compatibility determination, firmware version number and update needed, and future device specific executables that would extend the host or device's capability. For example, the agent could control the host and allow such functionality as using a USB device as a key to a system to permit access to specified functions in the host or in other functional areas outside the host that the host has authorization to access or control, auto-backup in a system (e.g., a user could carry a portable mass storage device to then plug into the system and command a backup of the system), auto-update a system (e.g., an I/O device could be used to upload data into the system), or auto-configure a system (e.g., at each terminal coupled to a system, such as a point of sale terminal).

Figure 3:
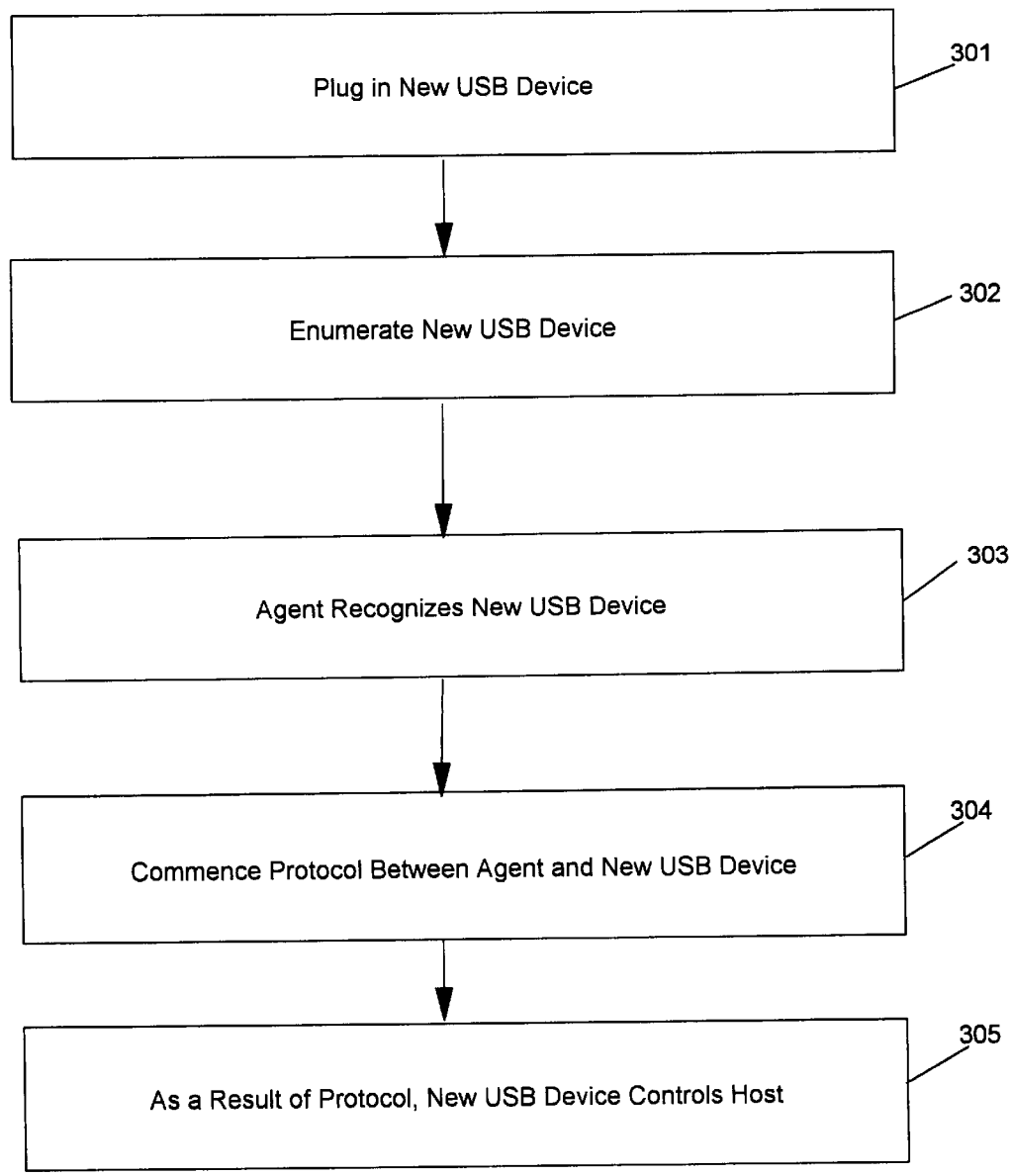
FIG. 3 illustrates a flow diagram in accordance with the present invention.

Referring to FIG. 3, the present invention provides an ability for a peripheral device to control the host through a common interface or standard interface that is predefined, which is contrary to what is accomplished in the prior art where software in the host controls the peripheral device. Once the device centric software is loaded into the host, as described above, any subsequent I/O USB device plugged into a USB port (step 301) and enumerated as a new USB device (step 302), will be recognized by the device centric agent in step 303. A standard interface that is predefined will initiate a protocol between the device centric agent and the USB device (step 304). As a result of this protocol, the newly connected USB device controls the operating system (step 305). The particular details for such a protocol can vary considerably, and can thus be configured as desired by the program designer. Such a protocol provides for many different operational aspects to be used with I/O devices in addition to diagnostics, tutorials, advertisements, and updates to the driver software for such devices. With such a protocol, the host device can control the agent to connect to the Internet and download such information or updates, even in an automatic fashion, such as every two months a request is made over the Internet for any updates to the driver software. As an example, a USB printer could control the device centric agent to access any updates to the fonts over the Internet on a periodic basis. Such a protocol could be implemented using a basic script language.

Figure 5B:
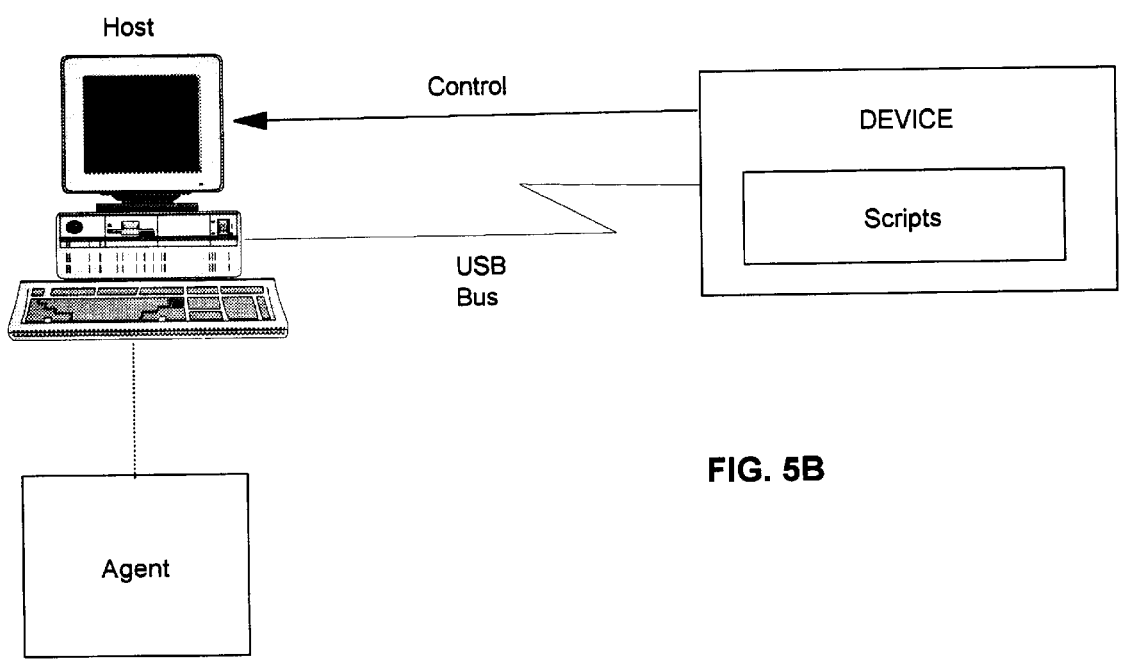

FIGS. 4, 5A and 5B illustrate alternative embodiments for implementing the present invention. In the first alternative embodiment illustrated in FIG. 4, the agent in the host acts as a USB device proxy by taking advantage of the host's JVM (java virtual machine), USB JAVA API, and OS specific ("Native") JAVA implementations. If the host does not have a JVM, USB JAVA API, and "Native" code, the provider of the agent can also provide them. Once the USB API is ported over the different JAVA supported platforms, then this scheme works independently of the underlying operating system. The USB API can be considered as a standard extension to the JAVA API. In a second embodiment illustrated in FIG. 5A, the USB device does not support a small embedded JVM. Once the device enumerates, it exposes an interface which allows the host to load the JAVA class files (executable JAVA byte code). The host then sets up a device proxy that it uses to perform the functions performed above, including diagnosing the USB device. In a third alternative embodiment illustrated in FIG. 5B, scripts embedded within the I/O device are used to control the host using a defined protocol.

Figure 6:
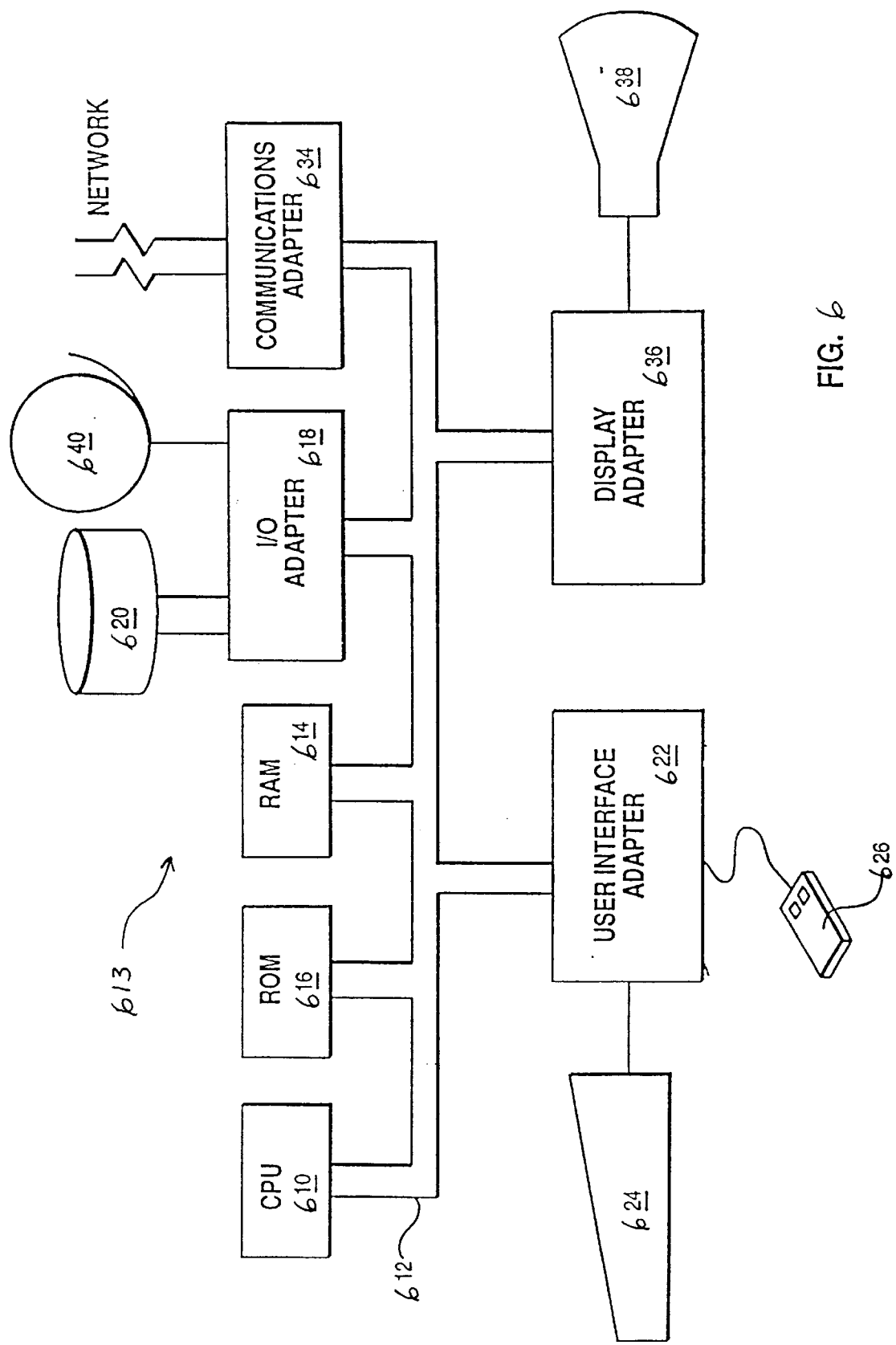
FIG. 6 illustrates a data processing system configured in accordance with the present invention.

Referring first to FIG. 6, an example is shown of a data processing system 600 which may be used for the invention. The system has a central processing unit (CPU) 610, which is coupled to various other components by system bus 612. Read only memory ("ROM") 616 is coupled to the system bus 612 and includes a basic input/output system ("BIOS") that controls certain basic functions of the data processing system 600. Random access memory ("RAM") 614, I/O adapter 618, and communications adapter 634 are also coupled to the system bus 612. I/O adapter 618 may be a small computer system interface ("SCSI") adapter that communicates with a disk storage device 620. Communications adapter 634 interconnects bus 612 with an outside network enabling the data processing system to communicate with other such systems. Input/Output devices are also connected to system bus 612 via user interface adapter 622 and display adapter 636. Keyboard 624, and mouse 626 are all interconnected to bus 612 via user interface adapter 622. Display monitor 638 is connected to system bus 612 by display adapter 636. In this manner, a user is capable of inputting to the system throughout the keyboard 624, or mouse 626 and receiving output from the system via display 638.

Preferred implementations of the invention include implementations as a computer system programmed to execute the method or methods described herein, and as a computer program product. According to the computer system implementation, sets of instructions for executing the method or methods are resident in the random access memory 614 of one or more computer systems configured generally as described above. Until required by the computer system, the set of instructions may be stored as a computer program product in another computer memory, for example, in disk drive 620 (which may include a removable memory such as an optical disk or floppy disk for eventual use in the disk drive 620). Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical, biological, or some other physical change. While it is convenient to describe the invention in terms of instructions, symbols, characters, or the like, the reader should remember that all of these and similar terms should be associated with the appropriate physical elements.

Note that the invention may describe terms such as comparing, validating, selecting, identifying, or other terms that could be associated with a human operator. However, for at least a number of the operations described herein which form part of at least one of the embodiments, no action by a human operator is desirable. The operations described are, in large part, machine operations processing electrical signals to generate other electrical signals.

Although the present invention and its advantages have been described in detail, it should be understood that various changes, substitutions and alterations can be made herein without departing from the spirit and scope of the invention as defined by the appended claims.

What is claimed is:

1. In a data processing system, a method comprising the steps of:

loading an agent program on top of an operating system running on the data processing system;

enumerating a USB device coupled to the data processing system;

initiating a protocol between the USB device and the agent program;

the USB device controlling the agent program as a function of the protocol; and as a function of the protocol, the agent program controlling an operation of a host in response to the USB device controlling the agent program, wherein the host can be rendered inoperable until the USB device relinquishes control of the host.

2. The method as recited in claim 1, wherein the operation loads a software program associated with the USB device.

3. The method as recited in claim 1, wherein the operation accesses information over the Internet.

4. The method as recited in claim 1, wherein the operation loads information from a storage device.

5. The method as recited in claim 1, wherein the operation launches a program.

6. A data processing system comprising:

means for loading an agent program on top of an operating system running on the data processing system;

means for enumerating a USB device coupled to the data processing system;

means for initiating a protocol between the USB device and the agent program;

the USB device having a means for controlling the agent program as a function of the protocol; and as a function of the protocol, the agent program having a means for controlling an operation of a host in response to the USB device controlling the agent program, wherein the host can be rendered inoperable until the USB device relinquishes control of the host.

7. The system as recited in claim 6, wherein the operation loads a software program associated with the USB device.

8. The system as recited in claim 6, wherein the operation accesses information over the Internet.

9. The system as recited in claim 6, wherein the operation loads information from a storage device.

10. The system as recited in claim 6, wherein the operation launches a program.

11. A data processing system comprising:

a processor;

a USB device;

a USB coupling the USB device to the processor;

an operating system running on the system;

a device centric agent running on top of the operating system; and a protocol implemented between the USB device and the agent program, wherein the USB device controls the agent program as a function of the protocol and the protocol controls an operation of a host, wherein the host can be rendered inoperable until the USB device relinquishes control of the host.

12. The system as recited in claim 11, wherein the operation loads a software program associated with the USB device.

13. The system as recited in claim 11, wherein the operation accesses information pertaining to the USB device over the Internet.

14. The system as recited in claim 11, wherein the operation loads information pertaining to the USB device from a storage device.

15. The system as recited in claim 11, wherein the operation launches a program.

16. The system as recited in claim 11, wherein the USB device adhering to the protocol contains instructions that directly control the host.

17. The system as recited in claim 11, wherein the USB device contains information pertinent to a user of the data processing system to permit the user to log in to the host and perform tasks specific to the user.

* * * * *